(12) United States Patent
Gale et al.

(10) Patent No.: US 6,445,079 B1
(45) Date of Patent: Sep. 3, 2002

(54) METHOD AND APPARATUS FOR CONTROLLING AN INDUCTION MACHINE

(75) Inventors: Allan Roy Gale, Livonia; Feng Liang, Canton; Michael W Degner, Farmington Hills, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 42 days.

(21) Appl. No.: 09/766,127

(22) Filed: Jan. 20, 2001

(51) Int. Cl.[7] .................................................. H02P 9/08
(52) U.S. Cl. ............................ 290/31; 290/32; 322/12
(58) Field of Search ............................. 322/10, 12, 13; 290/31, 32, 46, 36 R, 38 R

(56) References Cited

U.S. PATENT DOCUMENTS

| | | | |
|---|---|---|---|
| 4,743,777 A | 5/1988 | Shilling et al. | 290/46 |
| 4,786,852 A * | 11/1988 | Cook | 290/31 |
| 4,948,997 A | 8/1990 | Ohmitsu et al. | 310/113 |
| 5,065,086 A * | 11/1991 | Takakado | 290/46 |
| 5,281,905 A * | 1/1994 | Dhyanchand et al. | 290/38 R |
| 5,283,471 A | 2/1994 | Raad | 290/46 |
| 5,512,811 A * | 4/1996 | Latos et al. | 318/254 |
| 5,543,703 A | 8/1996 | Kusase et al. | 322/16 |
| 5,880,533 A | 3/1999 | Arai et al. | 290/31 |
| 5,998,976 A | 12/1999 | Steffan | 322/10 |
| 6,018,233 A * | 1/2000 | Glennon | 290/36 R |
| 6,278,194 B1 * | 8/2001 | Nakagawa et al. | 290/31 |

* cited by examiner

Primary Examiner—Nicholas Ponomarenko

(57) ABSTRACT

An electrical machine (10) suitable for use as a starter/alternator for an automotive vehicle, has an inverter circuit (12), a rectifier circuit (14), and a stator circuit (16) that couples the inverter circuit (12) to the rectifier circuit (14). In addition, a switch circuit (18) having a first switch, switch A, and a second switch, switch B, is used to couple inverter circuit (12) to rectifier circuit (14). By controlling the operation of switch circuit (18) so that in a start up mode the switches are closed and in a generating mode the switches are open, a high output torque may be obtained from the electrical machine while a wide operating speed range may be also achieved.

20 Claims, 2 Drawing Sheets

METHOD AND APPARATUS FOR CONTROLLING AN INDUCTION MACHINE

TECHNICAL FIELD

The present invention relates generally to internal combustion engines for automotive vehicles, and more specifically, to an automotive vehicle having a starter/alternator coupled to the engine.

BACKGROUND

Automotive vehicles with internal combustion engines are typically provided with both a starter motor and alternator. In recent years, a combined alternator and starter motor has been proposed. During initial startup of the vehicle, the starter/alternator functions as a starter. While functioning as a starter, the starter/alternator provides a sufficient amount of torque to rotate the crankshaft of the engine before the cylinders are fired.

After the engine is started, the starter/alternator is used as a generator to provide electric power to the electrical system of the vehicle and/or for driveline damping.

In foreseeable automotive applications, the engine may be shut down during stops (e.g., red lights). When the accelerator is depressed the engine will resume firing. Thus, many startups would occur over the course of a trip. Acceleration in such systems is inherently low absent intervention since torque levels from the engine upon startup are low. Thus, starter/alternators may be used to provide boost torque to help accelerate the vehicle as well.

As shown in FIG. 1, there are two distinct features that characterize the torque versus speed requirement of starter/alternators. The first is the high torque required to provide cold engine starts. The second distinct feature is the high generating power requirement in a wide speed range. To meet both the starting torque and generating power requirements simultaneously, the stator windings of a starter/alternator are typically designed with a low number of series turns to allow for a wider generating speed range. In order to simultaneously meet the starting torque requirement with a low number of series turns a high current level is needed, resulting in the starter/alternator having a relatively high peak current rating which often exceeds 700 amps for a 42-volt electrical system. The high peak current increases the current rating for the power devices, cabling and connectors. Also, cost, thermal requirements, electromagnetic interference and compatibility issues are also raised.

It would therefore be desirable to provide a starter/alternator capable of operating with a decreased peak current requirement during starting and which operates with an extended speed range for generating.

Known methods for accomplishing these goals include reconfiguring the stator windings from series to parallel or by changing them from a wye to a delta winding configuration. These types of configurations allow the stator winding to have a greater number of series turns during starting than during generating. Typically, however, such systems are very complex and costly due to the mechanical switches needed to provide the reconfiguration.

Another known method for achieving these goals is to provide a DC to DC boost converter to supply the inverter and the machine with an increased voltage during the generating mode over that of the nominal battery power provided in the vehicle. This allows the number of series turns in the stator windings to be increased, which decreases the amount of current needed to achieve the same starting torque. The cost associated with such a DC to DC converter is typically prohibitive.

It would therefore also be desirable to avoid the above-mentioned problems of reconfiguring the stator windings or adding a DC to DC converter to allow high starting torque and a wide speed range.

SUMMARY OF THE INVENTION

It is therefore one object of the invention to provide an improved integrated starter/alternator system suitable for use as a starter motor that allows high torque to be achieved during starting while providing a high generating power requirement over a wide range of speeds.

In one aspect of the invention, the system comprises an inverter circuit, a rectifier circuit and an electric machine, which has a stator circuit coupling to the inverter circuit and the rectifier circuit. A pair of switches selectively couples the rectifier circuit to the inverter circuit so that in a startup mode the switches are closed and in a generator mode the switches are open.

In a further aspect of the invention, a method of operating a system having a power supply, an electric machine with a stator winding circuit, an inverter circuit and a rectifier circuit comprises the steps of:

in a starting mode of operation, directly coupling the power supply to the inverter circuit though a pair of switches;

in a generating mode of operation, opening the pair of switches to decouple the inverter circuit from the power supply.

One advantage of the invention is that the current capacity required for the wiring and connectors is substantially reduced. This is true even though a higher voltage requirement exists for such configurations.

Another advantage of the invention is that the relatively large number of series turns connected to the inverter portion of the controller is such that the amount of magnetizing current is lower when compared with a lower turn number machine design. This reduces the inverter switching and conduction losses. Yet another advantage of the invention is that the turns ratio between the two stator coil groups may be changed depending on the particular system requirements.

Other objects and features of the present invention will become apparent when viewed in light of the detailed description of the preferred embodiment when taken in conjunction with the attached drawings and appended claims.

DESCRIPTION OF THE PREFERRED EMBODIMENT

Figure 1:
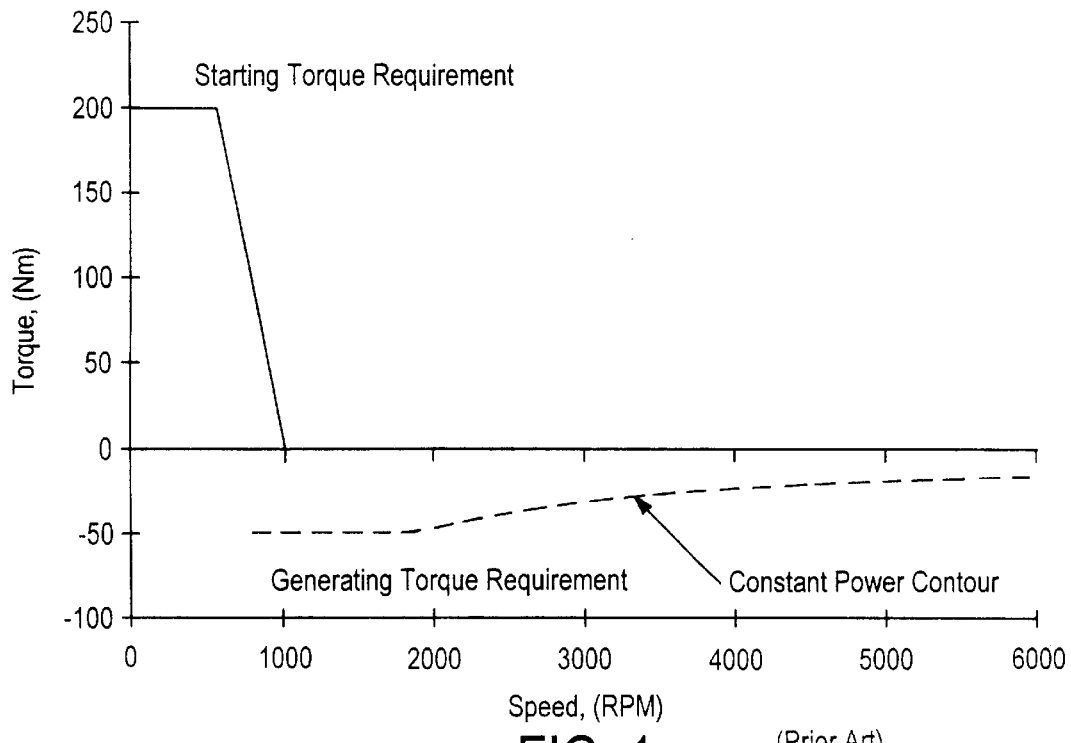
FIG. 1 is a plot of torque versus speed requirement of a starter/alternator for an automotive vehicle.

In the following figures, the same reference numerals will be used to identify the same components in the various views. The present invention is described with respect to a starter/alternator for an automotive vehicle. However, those skilled in the art will recognize other applications for the electrical machine that require a high starting torque and a generator that operates in a wide speed range.

Figure 2:
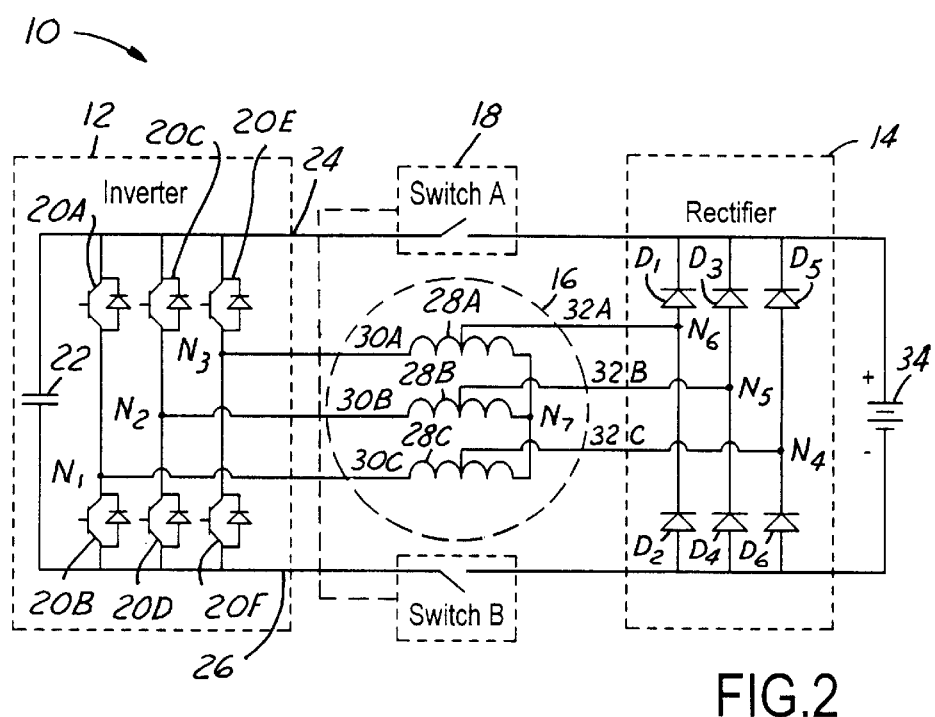
FIG. 2 is a schematic view of an electric machine formed according to the present invention.

Referring now to FIG. 2, a schematic view of an electrical machine system 10 that is suitable for use as a starter/alternator in an automotive vehicle, is illustrated. Electrical machine system 10 has an inverter circuit 12 and a rectifier circuit 14. A stator circuit 16 of the electrical machine is coupled between inverter circuit 12 and rectifier circuit 14. A switch circuit 18 selectively couples inverter circuit 12 to rectifier circuit 14 in addition to stator circuit 16. Switch circuit 18 comprises a first switch, switch A, and a second switch, switch B. As illustrated, switches A and B are illustrated as mechanical type switches. However, those skilled in the art will recognize that various types of switches including electrical switches may be incorporated as long as they are capable of functioning as described below. Preferably, switches A and B operate simultaneously.

Inverter circuit 12 includes a plurality of switching element 20A–20F and a capacitor 22. Switching element may include transistors and diode as is commonly known in the art. Inverter circuit 12 is used to control the operation of stator circuit 16 as will be further described below. In addition to the elements shown, the inverter 12 includes control circuitry for controlling the switching elements 20A–20F in a desirable manner.

Inverter circuit 12 is coupled to a feed bus 24 and a return bus 26 of electrical machine 10. Each switching element is coupled to either feed bus 24 or return bus 26. In the present configuration, switching elements 20A, 20C, and 20E are coupled to feed bus 24. Switching elements 20B, 20D, and 20F are coupled to return bus 26. Switching elements 20A and 20B have a common node N1 therebetween. Switching elements 20C and 20D have a common node N2 therebetween. Switching elements 20E and 20F have a common node N3 therebetween.

Rectifier circuit 14 is preferably a full wave rectifier having diodes D1–D6. Diodes D1, D3, and D5 are coupled to feed bus 24. As pictured, diodes D1, D3, and D5 have the cathode coupled to feed bus 24. Diodes D2, D4, and D6 are coupled to return bus 26. That is, diodes D2, D4, and D6 have anodes 26 coupled to return bus 26. Diodes D5 and D6 have a common node N4 therebetween. Diodes D3 and D4 have a common node N5 therebetween. Diodes D1 and D2 have a common node N6 therebetween.

Each of the diodes pairs D1 and D2, D3 and D4, and D5 and D6 have a respective anode coupled to a respective cathode. Stator circuit 16 generally comprises three windings configured in a predetermined manner. As will be further described below, alternative phase winding configurations may be used without varying from the true scope of the invention. In this embodiment, three windings 28A, 28B, and 28C each have a respective phase lead 30A, 30B, and 30C coupled to nodes N3, N2, and N1 respectively of inverter circuit 12. Windings 28A, 28B, and 28C have a common node N7 therebetween representing the common node of a wye configuration. Each of the windings has a phase lead 32A, 32B, and 32C coupled to nodes N6, N7, and N8 respectively of rectifier circuit 14. Phase leads 32A, 32B, and 32C are coupled to windings 28A, 28B, and 28C as a tapped phase lead.

A power supply 34 such as a battery is coupled to feed bus 24 and return bus 26 so that the positive lead of the power supply 34 is coupled to feed bus 24 and the neutral side of the battery is coupled to return bus 26.

Figure 3:
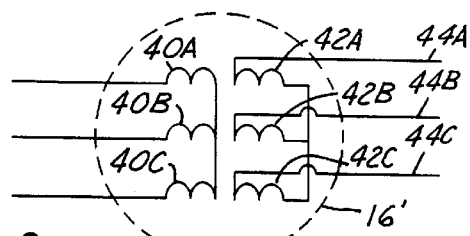
FIG. 3 is a partial schematic view of an alternative stator circuit according to the present invention.

Referring now to FIG. 3, an alternative embodiment of stator circuit 16' is illustrated having a dual winding configuration. Rather than using a tapped winding as shown in FIG. 2, stator circuit 16' has a first winding 40A, 40B, and 40C coupled in a wye configuration and a co-located second winding 42A, 42B, and 42C having respective phase leads 44A, 44B, and 44C coupled to rectifier circuit 14. The winding count of the first winding is preferably more than the second winding count. Windings 40A, 40B, and 40C are connected to the inverter circuit.

Those skilled in the art will recognize that additional stator winding configurations exist that may be used with the present invention. An example is a tapped stator winding. In this configuration the inner portion of the stator winding, which is connected to the rectifier circuit, could be connected in either a wye or a delta configuration. Other examples include a dual stator winding configuration where either or both sets of stator windings could be connected in a delta arrangement instead of a wye arrangement.

The operation of the circuits shown in FIGS. 2 and 3 is similar and therefore will be discussed simultaneously below.

In operation, two distinct modes of operation are present, a starting mode and a generating mode. Switches A and B are preferably simultaneously controlled. In starting mode, switches A and B are closed and inverter circuit 12 is operated in a manner to achieve the desired starting torque. In starting mode, operation is at a relatively low speed relative to the peak speed of electrical machine 10. Therefore, the back EMF in the machine is relatively low and diodes D1–D6 in the rectifier circuit 14 do not conduct. When electrically viewed from the inverter terminals, electrical machine 10 appears to have a relatively large number of series turns in starting mode.

In generating mode, switches A and B are opened to disconnect battery 34 from inverter 12. Inverter circuit 12 is operated so that the windings connected to nodes N1, N2, and N3 are excited with the necessary magnetizing field needed by the machine. The magnetic field created by this excitation induces a voltage in the stator windings that are connected to the diodes of rectifier circuit 14. The induced voltage in the stator windings causes the diodes to conduct and therefore power is generated back into the battery and the electrical system of the vehicle. The amounts of power generated can be controlled by varying the level of magnetization excitation supply from inverter circuit 12.

Figure 4:
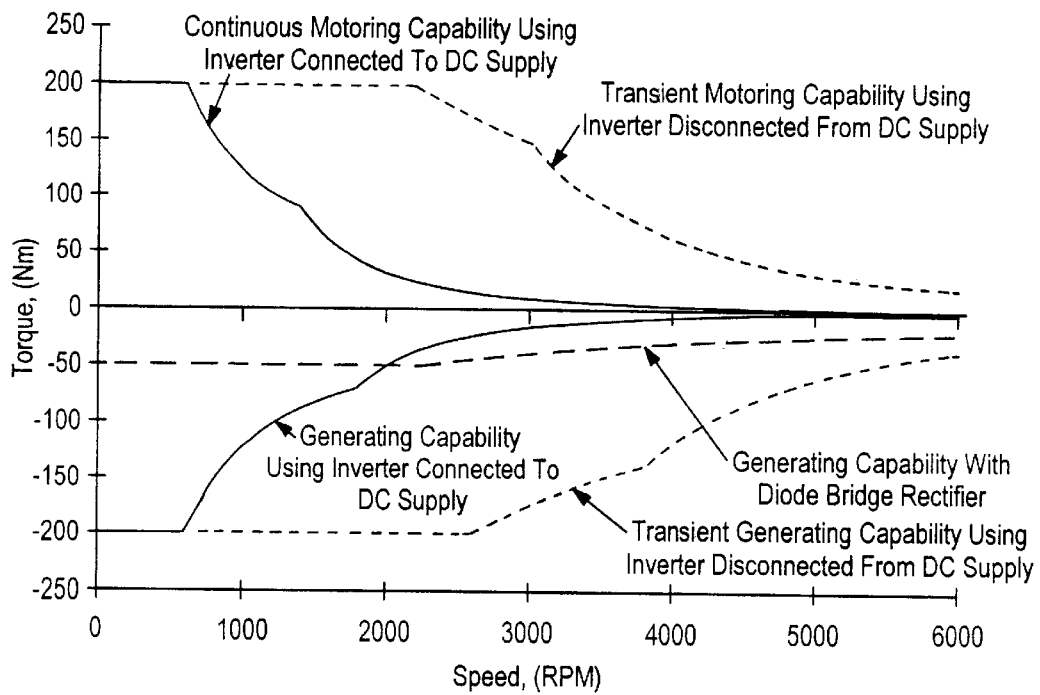
FIG. 4 is a plot of torque versus speed for various operating modes of a starter/alternator according to the present invention.

Referring now to FIG. 4, a torque versus speed plot of the electrical machine shown in FIG. 2 is illustrated. The torque versus speed plot is dependent on the number of turns chosen for the coil groups in each of the stator phase windings for a given phase current of the electric machine. The number of turns in the two coil groups may be chosen independently. This is in contrast to the switch configuration described in the background in which only a fixed ratio may be used.

Figure 5:
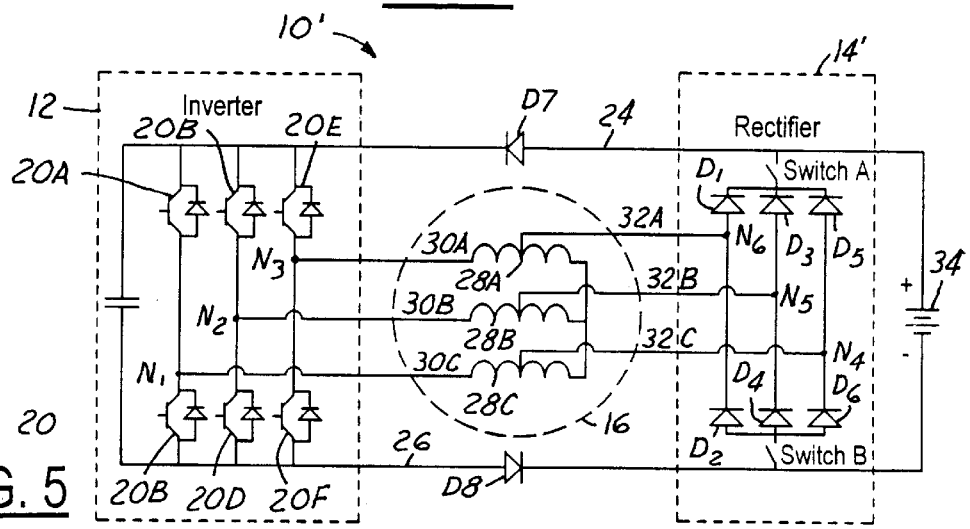
FIG. 5 is a schematic view of an alternative electric machine circuit according to the present invention.

As represented in FIG. 5, several modes of operation are illustrated. Essentially, four modes of operation are illustrated in FIG. 5. The first two modes of operation are when the inverter circuit 12 is coupled directly to the power supply 34. If the electrical machine 10 is properly controlled in this mode of operation, diodes D1–D6 will not conduct and the capability of electrical machine 10 is equivalent to that of a machine with the same total series turn in the stator winding operated using an inverter at the voltage level of power supply 34.

In a second mode of operation, the generating capability of the machine and the rectifier circuit 14 is illustrated. In this mode, inverter circuit 12 is operated to provide the necessary excitation to the machine so that diodes D1–D6 of rectifier circuit 14 conduct. The generating capability is shown for the same current rating in the inverter and diode rectifier portion. It should be noted, however, that the same current rating is not a requirement.

The final two capabilities shown in the figure are for the mode of operation where inverter circuit 12 is disconnected from the power supply 34 and operate to produce transient motoring or generating torque. These are illustrated as dashed lines in FIG. 5. Because of these configurations, all of the energy required to produce the transient torque or generated by the transient torque must either come from or be stored in capacitor 22. Because the capacitor has a size limit and voltage rating, only a limited operating capability in this region is possible and therefore the transient label is given thereto. The extended constant torque region for the transient mode of operation is a result of the increased voltage required in the inverter portion of the controller in order to supply the required magnetization excitation as the speed of the electrical machine 10 increases.

In the specific operation of the circuit, when inverter circuit 12 is disconnected from power supply 34, the charge in capacitor 22 connected thereacross needs to be maintained at a level so that there is a sufficient voltage to supply the required magnetic field. Therefore, inverter circuit 12 is controlled to produce not only the magnetization current but also a small torque-producing component of current. The required magnitude of this torque-producing current is such that it offsets the losses associated with providing the magnetization excitation to the machine, thereby maintaining the desired voltage in the capacitor. As the speed of the electrical machine 10 increases, the voltage needed to supply the required magnetization excitation will increase. Due to the relatively large number of series turns connected to the inverter portion of the controller, this voltage will eventually increase until it is greater than that of power supply 34, with its peak value being roughly equal to the power supply voltage times the ratio of the total series stator turns connected to the inverter circuit to the number of series turns connected to the rectifier circuit 14. The increased voltage in the inverter portion of the controller requires switching elements 20 in inverter circuit 12 to have a higher voltage rating than the diodes D1–D6 in rectifier circuit 14. The increased voltage rating of the device is offset by the reduced current rating compared to such configurations described in the background in which a single set of phase leads and inverter circuit are always connected to the power supply. Advantageously, the reduced current rating thus requires reduced current capacity for the wiring and the connectors associated therewith. Another advantage of the system is that the higher voltage portion is isolated from other portions in a vehicle. Also, the short duration of the starting events and relatively low magnetization current required in the windings connected to inverter circuit 12 allows the winding wires to be formed of a higher gauge and thus more room is available in the slots for the windings connected to rectifier circuit 14 and thus lowers their resistance and consequently reduces losses.

There are numerous ways in which the generating load needed to supply the electrical losses could be controlled. The first would be to run it continuously with its levels closely matched to that of the electrical losses. In this method the voltage of the capacitor across the inverter circuit would stay roughly constant (with the necessary increase in voltage as the speed increases). A second method would be to operate the generating load in a pulsed fashion so that the voltage of the capacitor across inverter circuit would increase to a higher level while the generating load was present and then decay to a lower level when the generating load was removed. The application and removal of the generating load is determined by the allowable variation in the voltage level (calibratable). It should be noted that the amount of generating required on average preferably compensates for electrical losses associated with the power supply.

Referring now to FIG. 5, the same reference numerals are used to identify the same components from FIG. 2. In this circuit, however, switch A' and switch B' have been moved within rectifier circuit 14. A pair of diodes D7 and D8 are used to separate rectifier circuit 14' from inverter circuit 12. In operation of this circuit during starting mode, switches A and B are opened and inverter circuit 12 are operated identically to that described above. The switches A' and B' when used in conjunction with diodes D7 and D8 prevent circulating current from flowing between rectifier circuit 14 and inverter 12 during starting mode. The diodes D7 and D8 clamp the voltage in inverter circuit 12 so it will not fall below that of power supply 34. Diodes D7 and D8 may allow the inverter circuit to be at a voltage level higher than that of the power supply 34 during the starting mode. This situation would occur if the capacitor across the inverter circuit were charged to a higher voltage level as may occur during the generating mode of operation. The presence of a higher voltage level allows for more energetic starts which would be useful, especially for a stop/start mode of operation in an automotive vehicle.

Another alternative embodiment eliminates switches A' and switch B' from that shown in FIG. 5. The operation of such is similar to that described above.

While particular embodiments of the invention have been shown and described, numerous variations and alternate embodiments will occur to those skilled in the art. Accordingly, it is intended that the invention be limited only in terms of the appended claims.

What is claimed is:

1. An electric machine having a power supply comprising:
   an inverter circuit;
   a rectifier circuit;
   a stator circuit coupling said inverter circuit to said rectifier circuit;
   a pair of switches selectively coupling said inverter circuit to said power supply so that in a starting mode said switches are closed and in a generating mode said switches are open.

2. An electrical machine as recited in claim 1 wherein said stator circuit comprises a plurality of windings having a respective tapped phase lead.

3. An electrical machine as recited in claim 1 wherein said plurality of windings are coupled in a wye.

4. An electrical machine as recited in claim 1 wherein said stator circuit comprises a dual winding configuration wherein a first winding portion is electrically separated from, co-located with and magnetically coupled to a second winding.

5. An electrical machine as recited in claim 1 wherein said electric machine comprises a starter alternator.

6. An electrical machine as recited in claim 1 wherein said pair of switches are incorporated into said rectifier circuit.

7. An electrical machine as recited in claim 6 further comprising a pair of diodes coupled between a respective switch and said inverter circuit.

8. An electrical machine as recited in claim 1 wherein said rectifier circuit comprises a full wave rectifier.

9. An electric machine having a power supply comprising:
   an inverter circuit;
   a rectifier circuit;
   a stator circuit coupling said inverter circuit to said rectifier circuit, said stator circuit having a first winding, a second winding, and a third winding coupled in a wye configuration; each winding having a phase lead coupled to said inverter circuit and tapped phase lead coupled to said rectifier circuit; and,
   a pair of switches selectively coupling said inverter circuit to said power supply so that in a starting mode said switches are closed and in a generating mode said switches are open.

10. An electrical machine as recited in claim 9 wherein said tapped lead having an effective winding turn count less than its respective winding.

11. An electrical machine as recited in claim 9 wherein said electric machine comprises a starter alternator.

12. An electrical machine as recited in claim 9 wherein said pair of switches are incorporated into said rectifier circuit.

13. An electrical machine as recited in claim 9 further comprising a pair of diodes coupled between a respective switch and said inverter circuit.

14. An electrical machine as recited in claim 9 wherein said rectifier circuit comprises a full wave rectifier.

15. A method of operating an electrical machine having a power supply, stator winding circuit, an inverter circuit and a rectifier circuit comprises the steps of:

in a starting mode of operation, directly coupling the power supply to the inverter circuit though a pair of switches;

in a generating mode of operation, opening the pair of switches to decouple the inverter circuit from the power supply.

16. A method as recited in claim 15 wherein said diode bridge comprises a plurality of diodes, wherein said step of directly coupling comprises controlling the operation of said plurality of diodes to be non-conducting.

17. An electrical machine as recited in claim 15 wherein the step of opening comprises the steps of controlling the operation of said plurality of diodes to be conducting.

18. An electrical machine as recited in claim 15 wherein the step of directly coupling comprises controlling the operation of said plurality of diodes to be non-conducting.

19. An electrical machine as recited in claim 15 wherein the step of inducing a magnetic field in the stator windings so that power is supplied to the power supply.

20. An electrical machine as recited in claim 15 further comprising a capacitor coupled to the inverter circuit, wherein the step of opening comprises the step of maintaining or increasing the voltage level across the capacitor as a speed of the electrical machine increases.

* * * * *